Figure 10:
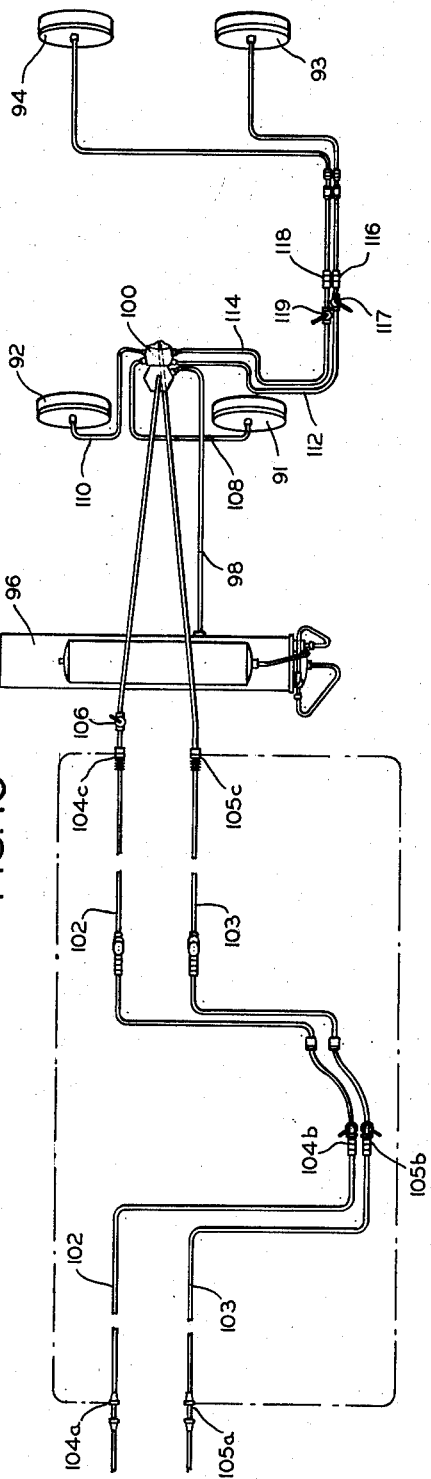

Sept. 3, 1963
G. D. DE ROSHIA
SECTIONAL TRAILER
3,102,738
Filed June 22, 1961
9 Sheets—Sheet 1
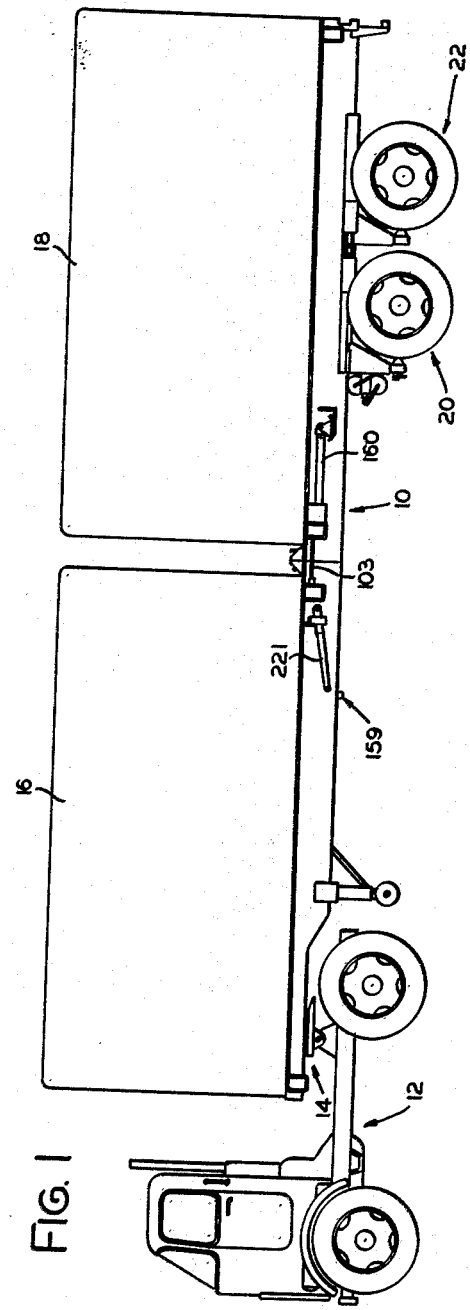
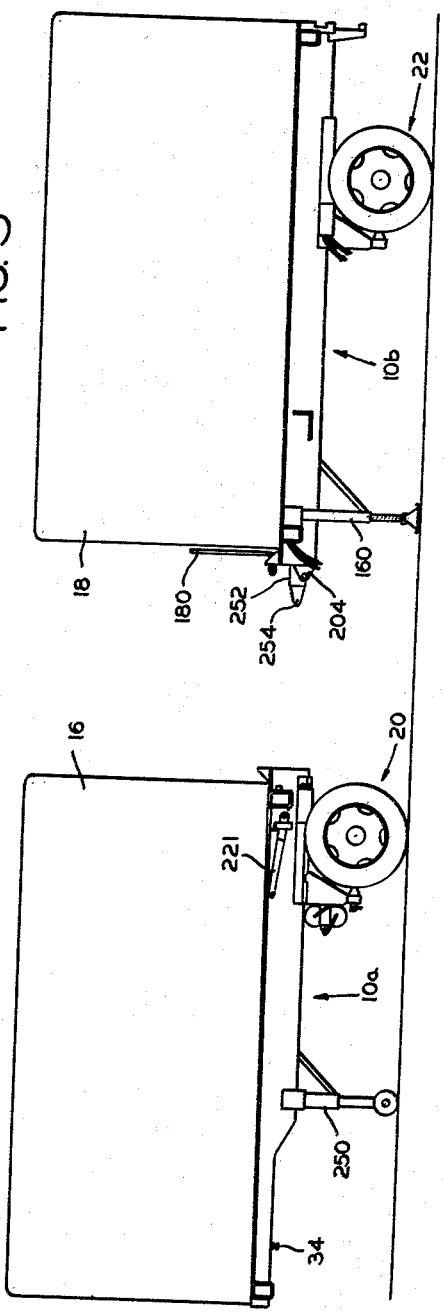
INVENTOR
GARLAND D. DE ROSHIA
BY *Kenneth C. Witt*
ATTORNEY Sept. 3, 1963
G. D. DE ROSHIA
3,102,738
SECTIONAL TRAILER
Filed June 22, 1961
9 Sheets-Sheet 2
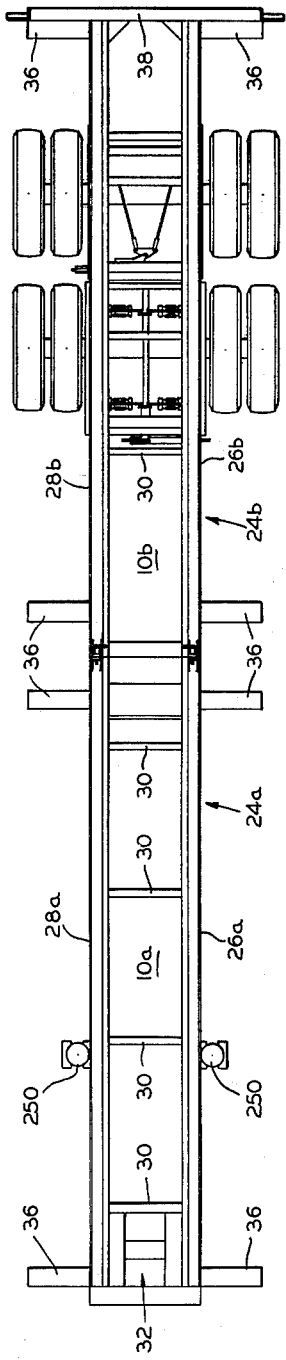
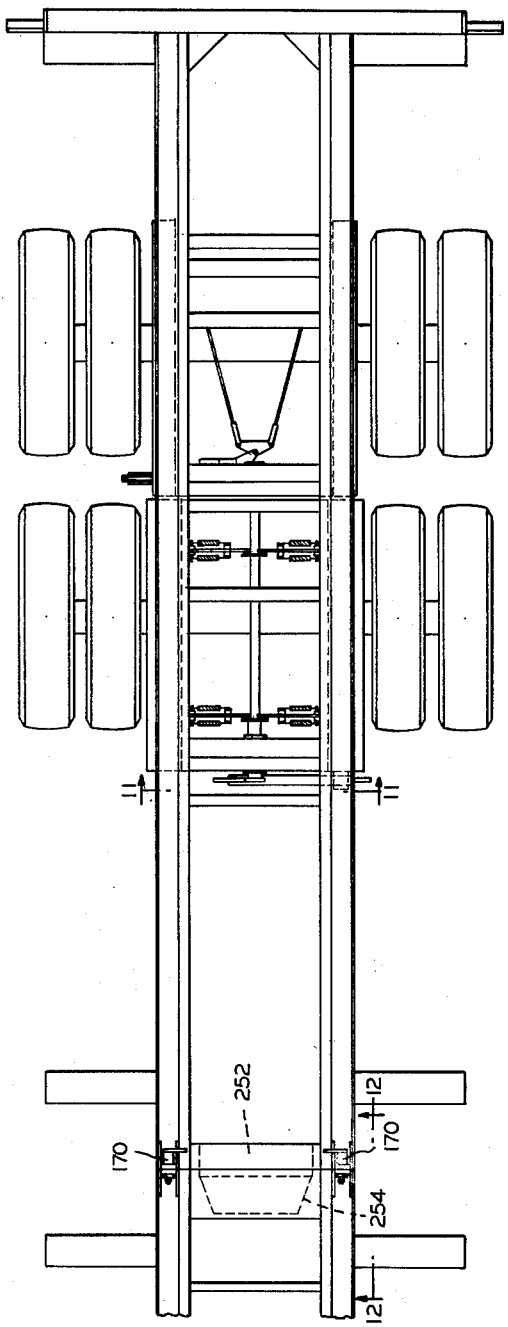
INVENTOR
GARLAND D. DE ROSHIA
BY *Kenneth C. Witt*
ATTORNEY Sept. 3, 1963
G. D. DE ROSHIA
3,102,738
SECTIONAL TRAILER
Filed June 22, 1961
9 Sheets-Sheet 3
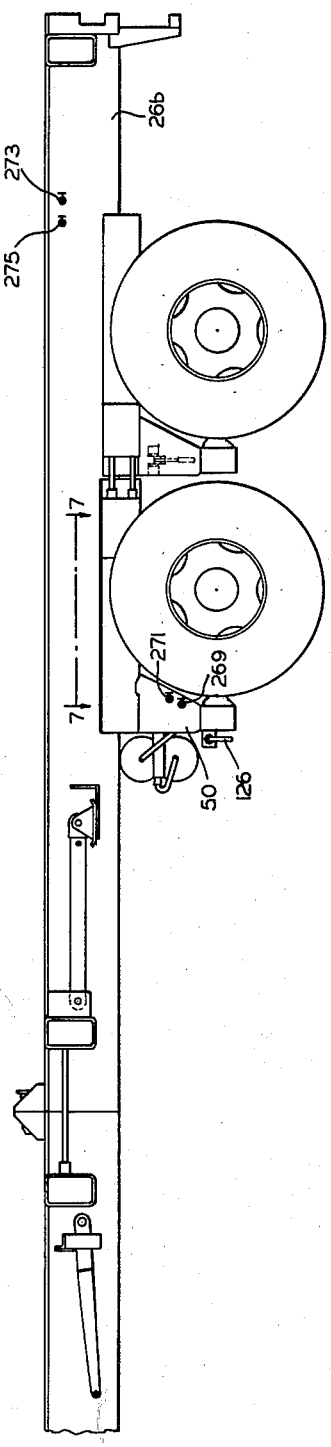
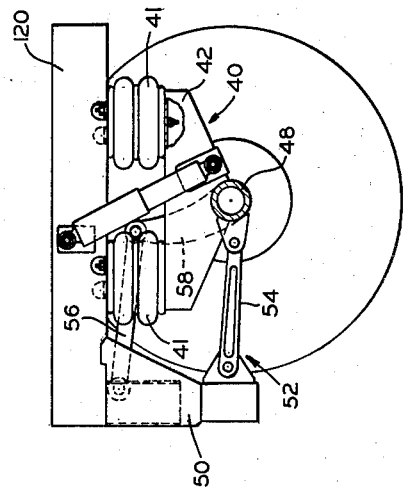
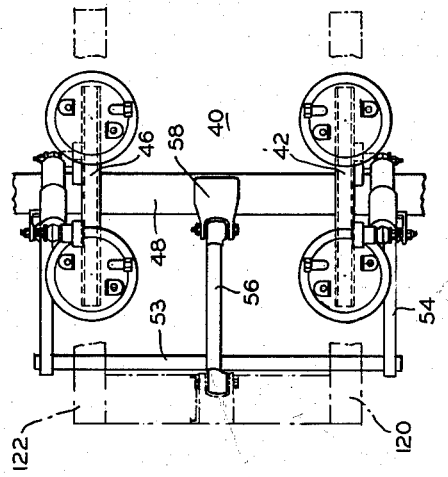
INVENTOR
GARLAND D. DeROSHIA
BY
ATTORNEY Sept. 3, 1963 G. D. DE ROSHIA 3,102,738
SECTIONAL TRAILER
Filed June 22, 1961 9 Sheets-Sheet 4
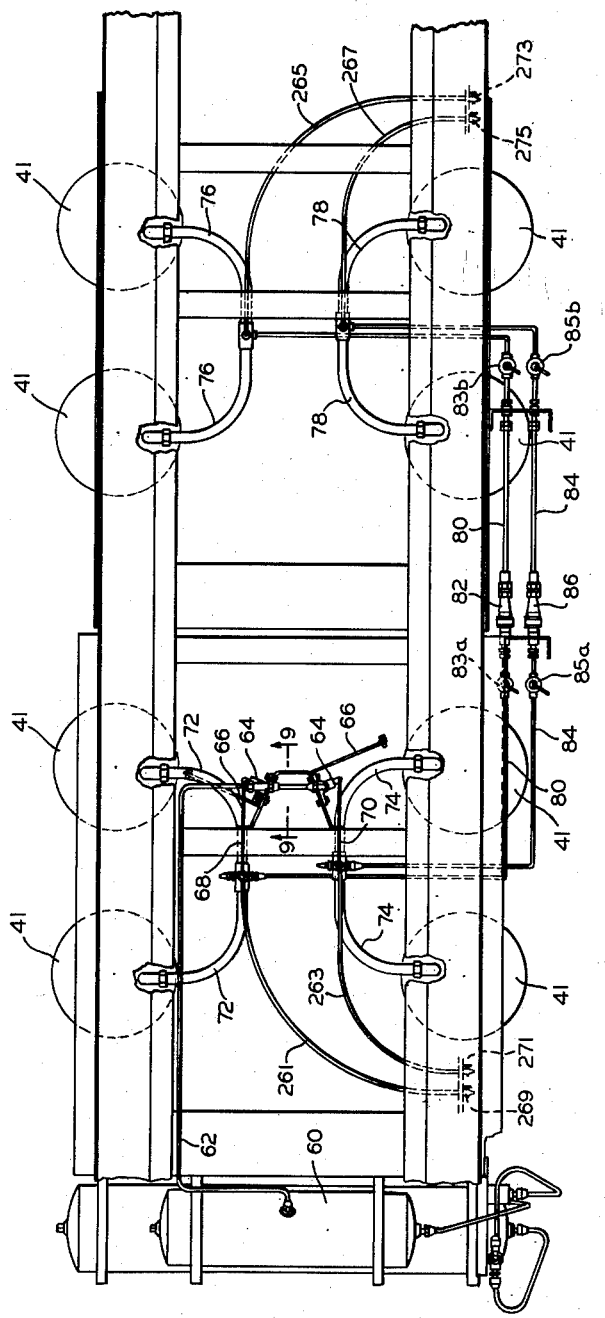
INVENTOR
GARLAND D. DEROSHIA
BY Kenneth C. Witt
ATTORNEY Sept. 3, 1963

G. D. DE ROSHIA
SECTIONAL TRAILER 3,102,738

Filed June 22, 1961

9 Sheets-Sheet 5

INVENTOR
GARLAND D. DeROSHIA
BY *Kenneth C. Witt*
ATTORNEY

Sept. 3, 1963

G. D. DE ROSHIA 3,102,738

SECTIONAL TRAILER

Filed June 22, 1961

9 Sheets-Sheet 6

INVENTOR
GARLAND D. DE ROSHIA
BY Kenneth C. Witt

ATTORNEY

Sept. 3, 1963 G. D. DE ROSHIA 3,102,738
SECTIONAL TRAILER
Filed June 22, 1961 9 Sheets-Sheet 7

INVENTOR
GARLAND D. DEROSHIA
BY Kenneth C. Witt
ATTORNEY

Sept. 3, 1963

G. D. DE ROSHIA 3,102,738

SECTIONAL TRAILER

Filed June 22, 1961

9 Sheets-Sheet 8

INVENTOR
GARLAND D. DE ROSHIA
BY Kenneth C. Witt
ATTORNEY

Sept. 3, 1963 G. D. DE ROSHIA 3,102,738
SECTIONAL TRAILER
Filed June 22, 1961 9 Sheets-Sheet 9

INVENTOR
GARLAND D. DeROSHIA
BY Kenneth C. Witt
ATTORNEY

{ # United States Patent Office 3,102,738
Patented Sept. 3, 1963

3,102,738
SECTIONAL TRAILER
Garland D. De Roshia, La Porte, Ind., assignor to Clark Equipment Company, a corporation of Michigan
Filed June 22, 1961, Ser. No. 118,948
3 Claims. (Cl. 280—415)

This invention relates to trailers, and more particularly to semi-trailers of the type adapted to be coupled by means of a so-called fifth wheel connection to a highway tractor whereby the semi-trailer can be pulled by the tractor over streets, highways and the like.

For use on intercity and interstate highways it is generally desirable that semi-trailers be made as long as possible, consistent with the length limitations imposed by statutes and regulations of the various states and other governmental units. However, such semi-trailers, which may be 35 or 40 ft. long or more, produce difficulties in operation and use on narrow city streets and in crowded loading dock areas.

The object of the present invention is to provide a semi-trailer construction in which the trailer may be made as permissible for use on intercity and interstate highways but which may be separated into two sections, each part with its own wheels, for use in congested areas.

In carrying out my invention in one preferred form I provide a semi-trailer having the frame or chassis portion thereof in two parts. The two parts may be separated. Two sets of wheels are provided. One set of wheels is fixed to the rear frame portion of the semi-trailer. The other set of wheels may be slid between the two frame portions when they are connected together. When it is desired to use the semi-trailer as a single unit the front wheels are slid to the rear near the other wheels and the semi-trailer operates in the same manner as a normal semi-trailer with tandem axles. When it is desirable to separate the trailer into two sections the movable wheels are moved forwardly to the rear of the front portion of the trailer frame, after which the two portions of the frame may be separated to form two separated wheeled units.

Figure 9:
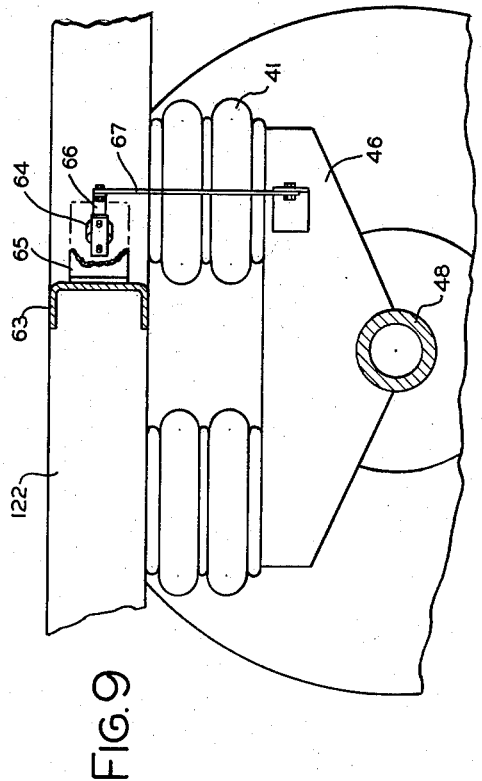
Figure 11:
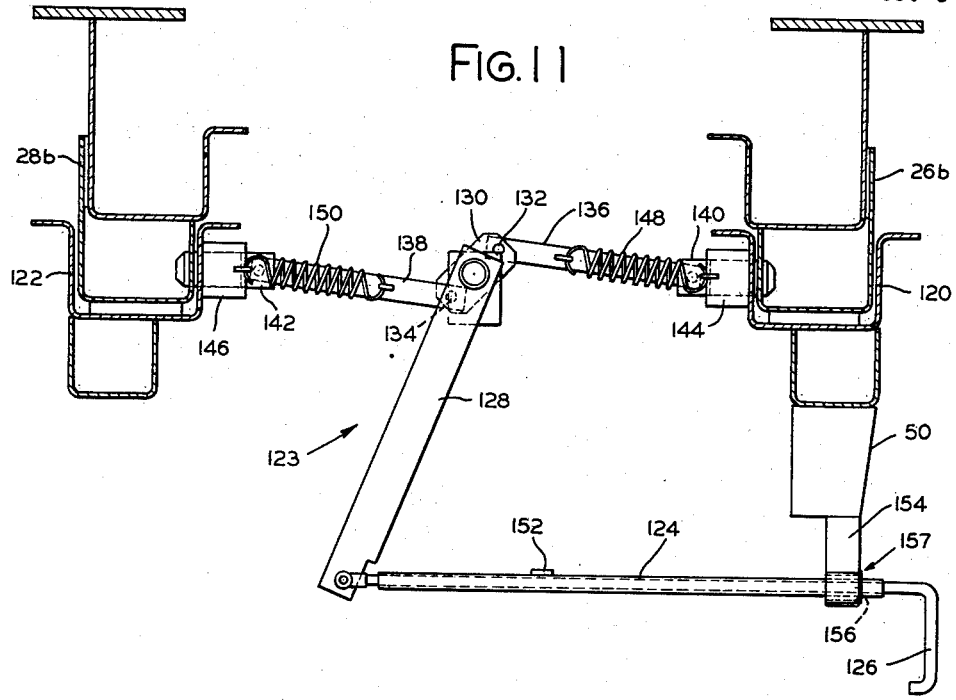
Figure 12:
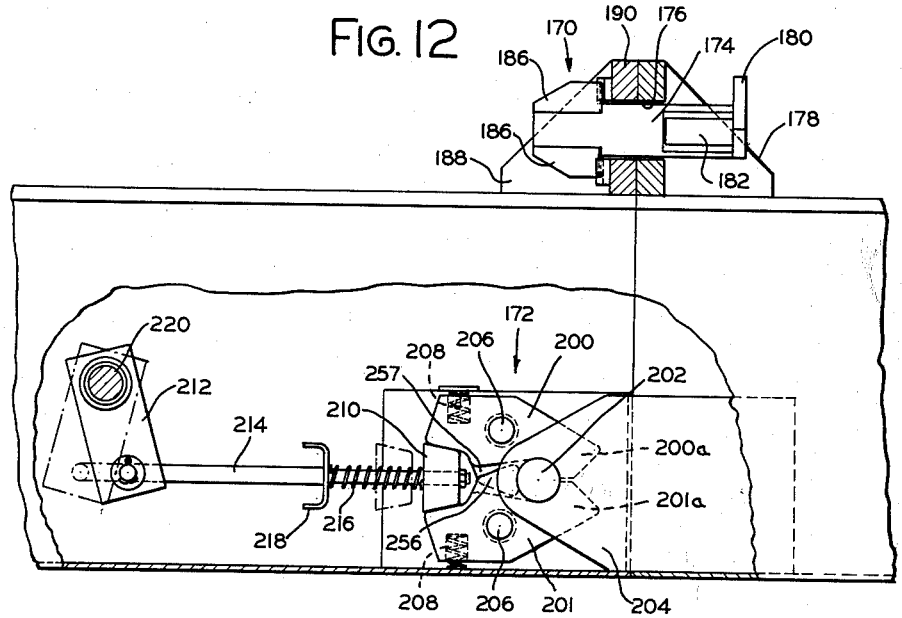
Figure 13:
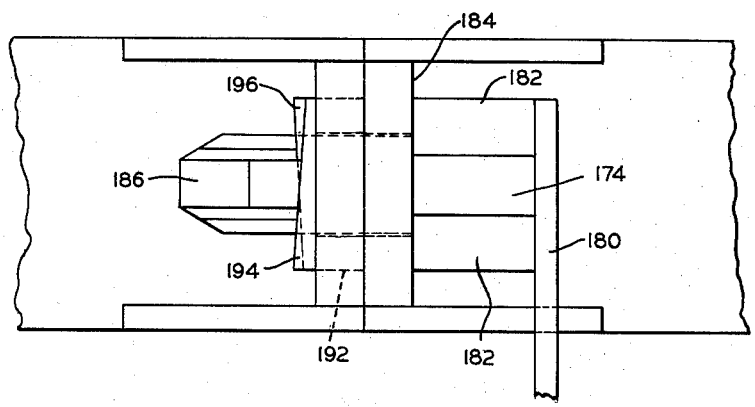
Figure 14:
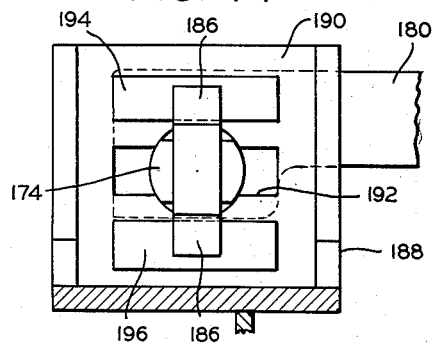
Figure 15:
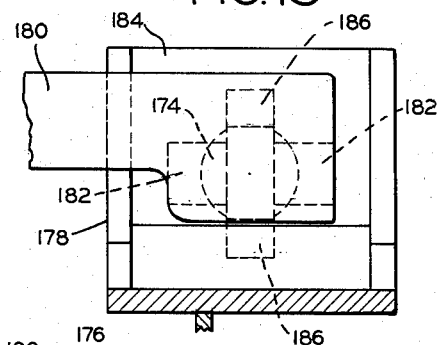
Figure 17:
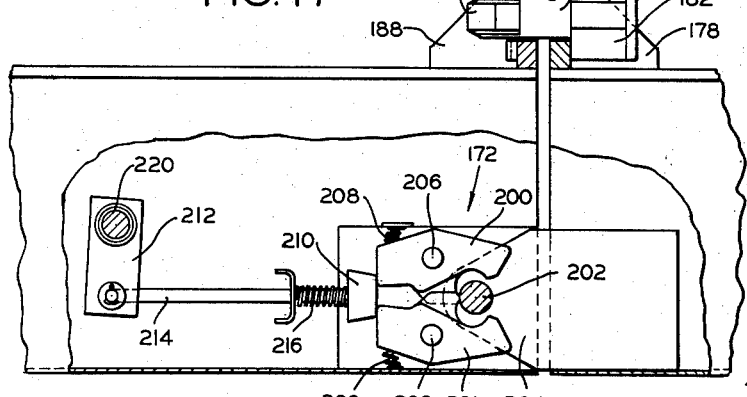
Figure 16:
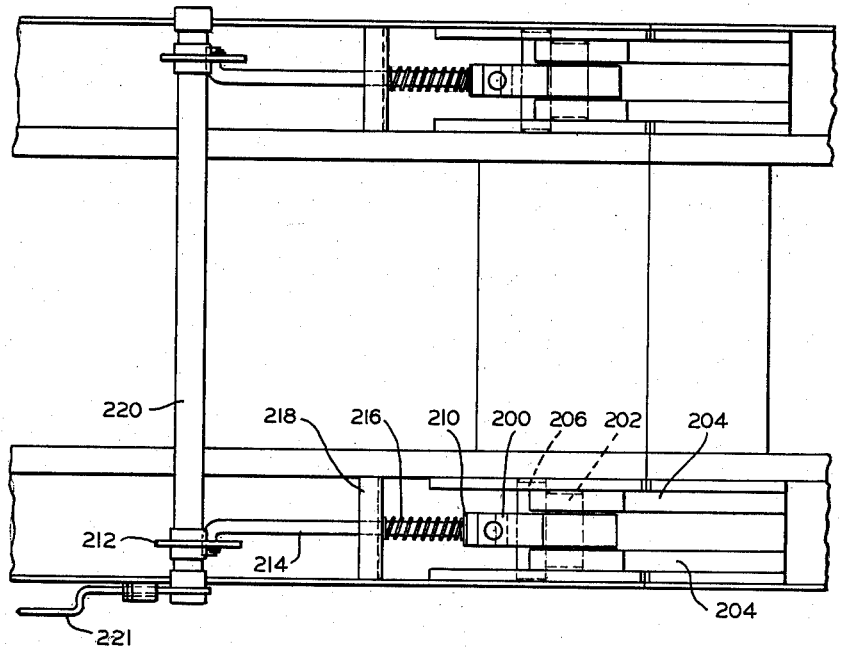
Figure 19:
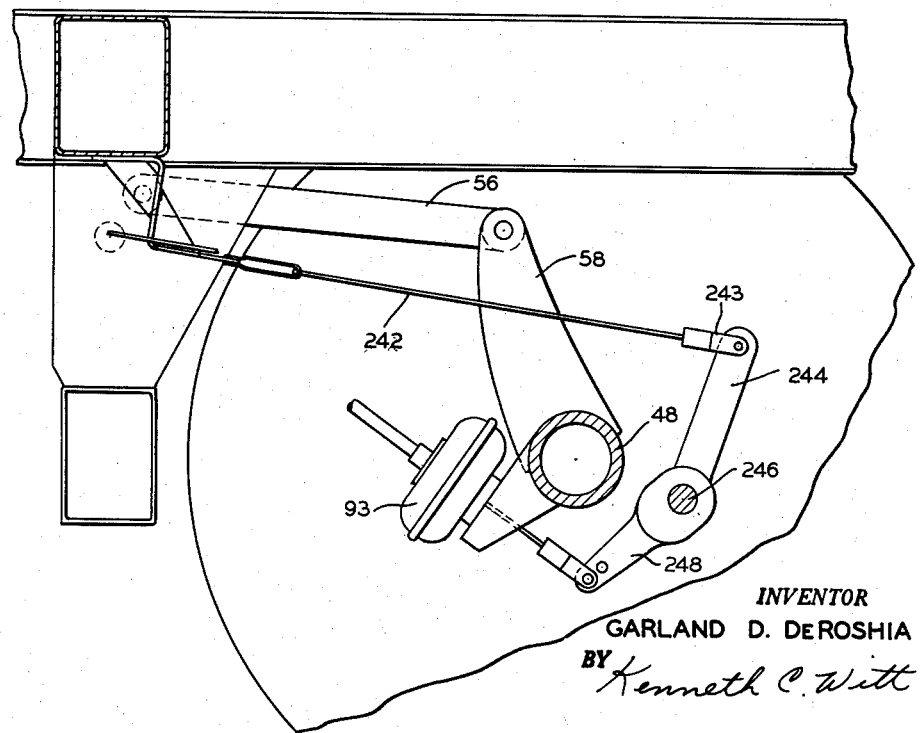
Figure 18:
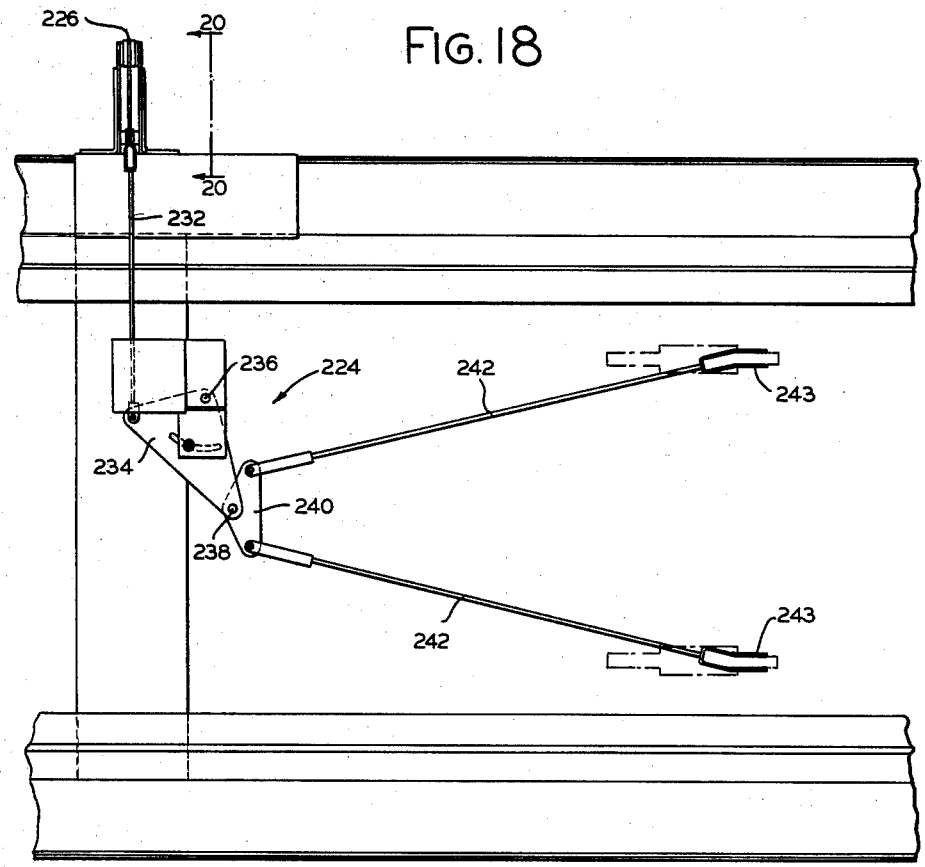
Figure 20:
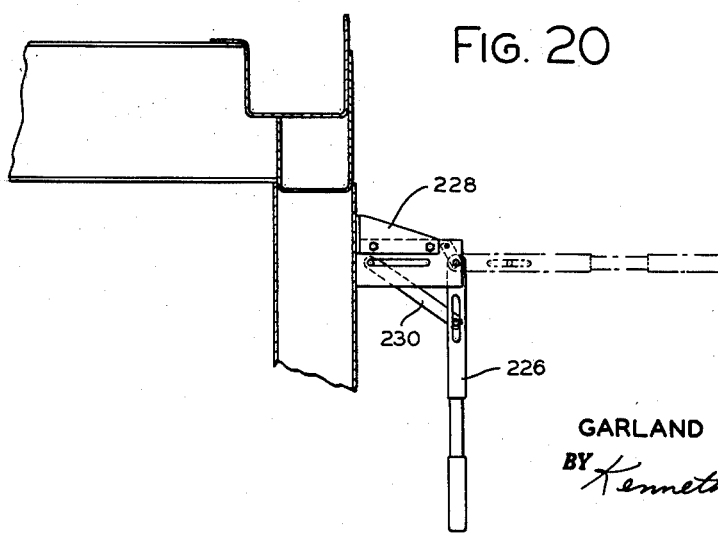

For a clearer and more complete understanding of my invention reference should be had to the accompanying drawing in which:

FIGURE 1 is a side elevation showing the present invention assembled as a single long semi-trailer with tandem axles, FIGURE 2 and FIGURE 3 show the structure of FIGURE 1 separated into two short sections each with a single axle, FIGURE 4 is a top plan view of the semi-trailer of FIG. 1 with certain parts removed, FIGURE 5 is a top plan view on an enlarged scale of a portion of the structure of FIG. 4, FIGURE 6 is a side elevation of approximately the same portion of the structure as FIG. 5, FIGURE 6a is an enlarged view of the air suspension mechanism for the front wheel assembly with the near wheel removed to reveal the details of the suspension mechanism, FIGURE 7 is an enlarged top plan view of the air suspension mechanism for the front wheel, approximately along the lines 7—7 of FIG. 6, with certain structural parts of the semi-trailer removed to show better the air suspension mechanism, FIGURE 8 is a diagram of the air system for the air springs which are included in the air suspension mechanisms for the front and rear wheel assemblies, FIGURE 9 is a partially schematic fragmentary view, approximatey along line 9—9 of FIGURE 8, showing one of the leveling valves which is included in the air system of FIG. 8, FIGURE 10 is a diagram of the air brake system for the trailer, FIGURE 11 is a sectional view along the line 11—11 of FIG. 5 showing on an enlarged scale the latching mechanism for the movable front wheel assembly, FIGURE 12 is an enlarged fragmentary sectional view along the lines 12—12 of FIG. 5 showing in detail the means for latching the two sections of the semi-trailers, FIGURES 13, 14 and 15 show additional views of one of the latching mechanisms included in this trailer, FIGURES 16 and 17 show additional views of another one of the latching mechanisms, and FIGURES 18, 19 and 20 illustrate a manual brake mechanism which is associated with the rear wheel assembly.

Referring to FIGURE 1 of the drawing, the numeral 10 indicates generally a semi-trailer embodying the present invention which is connected to be towed by a highway tractor or truck 12, the connection between the tractor and trailer being made by a conventional fifth wheel coupling at 14. The semi-trailer 10 is illustrated in FIG. 1 transporting two detachable containers 16 and 18. As shown in FIG. 1 the semi-trailer 10 is provided with tandem wheel assemblies, the front wheel assembly being indicated generally by the numeral 20 and the rear wheel assembly generally by the numeral 22.

In FIGURES 2 and 3 the semi-trailer 10 of FIG. 1 is shown after it has been separated into two sections which are indicated generally by the numeral 10a for the front section and 10b for the rear section. It will be observed that the wheel assembly 20 was moved forwardly from its previous location to the rearward end of section 10a before the two sections were separated, while wheel assembly 22 remains in its initial position. Other parts, features, advantages of this structure, and the manner in which the two sections are connected to form a single semi-trailer unit or separated to form separate body portions, are described in detail hereinafter.

FIGURE 4 shows a top plan view of the complete semi-trailer depicted in FIG. 1 without the highway tractor, and with the two detachable containers 16 and 18 removed. Each of the sections 10a and 10b of the semi-trailer includes a horizontally disposed frame or chassis portion and these are indicated respectively by the characters 24a and 24b. The front frame structure 24a includes a pair of longitudinal side frame members 26a and 28a respectively connected by a plurality of cross members 30. Near the front end a transverse structure 32 is provided upon which is mounted the downwardly projecting king pin 34, visible in FIG. 2, which forms a portion of the fifth wheel coupling means between the semi-trailer and the highway tractor. The front frame structure 24a also includes four outwardly projecting arms or bolsters 36, two each adjacent the front and rear respectively of the front frame structure, which provides support for the four corners of the container 16.

The rear frame structure 24b is generally similar to the front frame structure 24a and includes a pair of side frame members 26b and 28b interconnected by a plurality of cross members 30. The rear frame structure likewise has four bolsters 36 projecting two each from the front and rear to support the corners of container 18. The rear frame portion also is provided with a bumper member 38 across the rear.

Each of the wheel assemblies 20 and 22 includes an air suspension mechanism for supporting the frame or chassis of the semi-trailer on the wheels. The air suspension mechanism for the movable front wheel assembly is illustrated in FIGS. 6a and 7 of the drawing, and the air suspension mechanism is indicated generally by the numeral 40 in these figures. The suspension mechanism 40 includes two pairs of air springs 41 which are interposed respectively between sub-frame members above and bracket members below, and for the left side of suspension 40 the sub-frame member is indicated by the numeral 120 and the bracket member by the numeral 42, while for the right side of the suspension which is visible only in FIG. 7, the sub-frame member is indicated by the numeral 122 and the bracket member by the numeral 46. As explained in detail hereinafter the front suspension mechanism is movable while the rear suspension is fixed to the longitudinal frame members 26b and 28b, however, except for this difference the suspension mechanism for the rear wheel assembly is the same as described herein for the front wheel assembly. The brackets 42 and 46 adjacent the respective sides of the trailer are connected to a transverse tubular axle 48 at the end of which the wheels are rotatably mounted. As illustrated, dual wheels are provided at each end of each axle, however these could be single wheels within the scope of the present invention. The suspension mechanism 40 includes a depending bracket structure 50 at each side of the trailer, only the bracket structure on the left side being illustrated in the drawing. A sway bar assembly indicated generally by the numeral 52 is carried at the bottoms of these bracket members, such sway bar assembly comprising a torsion bar portion 53 extending between the two brackets and arm or radius rod portions 54 at the ends of the torsion bar portion forming a generally U-shaped assembly, the radius rod portions being connected to the axle adjacent respectively the brackets 42 and 44. An additional radius rod 56 is connected between an upper portion of the suspension and an arm 58 which is secured to and projects upwardly from the axle 48. Air under pressure in the air spring devices supports the vehicle and its cargo on the wheels and provides desirable riding qualities both in the loaded and unloaded condition of the vehicle. The air springs also maintain the frame at a uniform height, whether the trailer is loaded or unloaded, because of automatic leveling valves, except that the height can be changed manually if desired under certain conditions. The sway bars and radius rods restrain the movements of the axles to prevent undesirable longitudinal and side motions and other motions and also they aid in absorbing braking torques and other shock loads which occur during operation. For a more complete understanding of the air suspensions reference is made to Patent No. 2,970,848, Rice, dated February 7, 1961, which is assigned to the same assignee as the present invention. The present air suspensions differ in some constructional details from that of the patent but they are the same in principle and operation. Reference is made particularly to FIGURE 4 of the said patent which shows a single axle air suspension; each of the two air suspensions in the present invention is essentially the same as the structure of the said FIGURE 4.

FIGURE 8 shows somewhat schematically the air system for the air springs. The air lines or conduits, valves and other parts of this air system have been omitted from earlier figures in order to simplify them and make them more readily understandable. The air system for the air brakes is considered later and is shown in FIGURE 10. The reservoir for the air system for the air springs is indicated by the numeral 60. It will be appreciated that this reservoir is kept charged at all times during operation by a suitable compressor which is not illustrated. The use of such compressors on highway vehicles for charging air reservoirs or tanks for air suspensions and air brakes is well-known. From reservoir 60 a conduit 62 leads to a pair of leveling valves 64 which admit air to the air springs on the respective sides of the vehicle or discharge air from the air springs, whenever necessary to restore the frame portion of the vehicle to a preselected height, because of an increase or decrease in the load. Each of these valves is connected by a lever arm 66 to an unsprung portion on the suspension, as illustrated in greater detail in FIGURE 9 so that the leveling valve is responsive to the height of the frame portion relative to the axle and other unsprung portions of the suspension. FIG. 9 which is taken along the line 9—9 of FIG. 8, is somewhat schematic. This figure shows a cross-brace member 63 forming a portion of the suspension structure. Brace member 63 carries a bracket 65, a part of which is broken away to show leveling valve 64 which is mounted on the reverse side of it. The arm 66 projecting from the leveling valve is connected by means of a link 67 to bracket 46 which as described previously is connected to the axle 48 and which provides the support for air spring 41. Leveling valves which will accomplish the function described are known and one typical valve of this type is disclosed in Patent No. 2,905,462 which also provides additional discussion on the problem of maintaining the preselected height of the frame or body of the vehicle under all conditions when the vehicle is equipped with air springs. The leveling valves are connected by means of small conduits 68 and 70 to manifolds 72 and 74 on the right and left sides of the trailer respectively. Manifold 72 interconnects the two air springs 41 on the movable (front) air suspension on the right side of the vehicle while manifold 74 interconnects the two air springs 41 on the left side of the movable suspension. The air springs on the rear fixed suspension also are provided with similar manifolds, manifold 76 interconnecting the two right air springs while manifold 78 interconnects the two left air springs. Manifold 72 and manifold 76 both on the right side of the trailer, are connected by means of a line or conduit 80 which has a disconnect coupling 82 therein to provide for disconnecting and moving the front suspension. Included in line 80 are shut-off valves 83a and 83b the operation of which is described hereinafter. Manifolds 74 and 78 on the left side of the trailer are interconnected by a line 84 which has a disconnect coupling 86 and shut-off valves 87a and 87b therein. Thus the leveling valve 64 on the right side of the trailer serves all four of the air springs on that side of the trailer while the other leveling valve 64 serves all of the air springs on the left side of the trailer when two suspension mechanisms are adjacent each other as illustrated in FIG. 1 during which time the semi-trailer is suitable for operation as a single unit.

FIGURE 10 is a partially schematic view of the air brake system for the semi-trailer. While this system is shown separately in order to simplify the various figures of the drawing it will be appreciated that the various conduits and lines of this system actually are closely adjacent to and in some cases intertwine with the air suspension system just described. Each of the aforesaid dual wheels is provided with an air brake which is operated in the normal manner by four actuators 91, 92, 93 and 94. These actuators operate respectively the brakes for the left wheels on the movable suspension, the right wheels on the movable suspension, the left wheels on the fixed suspension and the right wheels on the fixed suspension. Air under pressure for operating these air brakes is supplied through the medium of a valve 100 which may be, for example, a Bendix-Westinghouse type RE-4 relay emergency valve. Pressurized air for the brakes normally flows to the valve 100 through a conduit 103 from a reservoir on the truck or tractor. If the pressure in conduit 103 should fall below a predetermined value, air is automatically supplied from reservoir 96 through conduit 98 to provide for actuation of the air brakes, the valve 100 accomplishing such automatic change-over in a known manner. The amount of air admitted by valve 100 to apply the air brakes is determined by the pressure of air in conduit 102 which is responsive to the position of the brake pedal in the truck or tractor. Whenever the operator depresses the brake pedal the valve 100 is operated by the pressure change in line 102.

Included in the conduit 102 are disconnect couplings 104a, 104b and 104c and a shut-off valve 106, the operation of which is explained subsequently. Included in conduit 103 are disconnect couplings 105a, 105b and 105c. The operation of valve 100 causes air under pressure to flow from conduit 103 (or emergency conduit 98) through conduits 108, 110, 112 and 114 to air actuators 91, 92, 93 and 94, respectively, to apply the brakes at the four sets of dual wheels. The release of the brake pedal by the truck operator releases valve 100 and releases air from the conduits 108, 110, 112 and 114 to release the brakes. A disconnect coupling 116 and a shut-off valve 117 and a disconnect coupling 118 and a shut-off valve 119 are included in lines 112 and 114 respectively for a purpose described hereinafter.

The front wheel assembly 20 is arrange to slide forwardly from the position shown in FIG. 1 to the rearward end of the front section of the semi-trailer in the position indicated in FIG. 2. FIGURE 11 illustrates the structure and the manner in which such sliding action is accomplished. This figure shows the side rails or frame members 26b and 28b. Beneath these members the front wheel assembly is provided with a pair of longitudinally extending channel-shaped members 120 and 122 in which frame members 26b and 28b respectively are supported. The channel members 120 and 122 are releasably secured to their respective side frame members by means of the latching mechanism 123 illustrated in FIGURE 11 which includes a rod 124 with a handle portion 126 protruding on the left side of the trailer. The rod 124 is pivotally connected to a lever 128 which is rigidly connected to a short lever member 130 which in turn is pivotally connected at 132 and 134 to a pair of links 136 and 138. The latter links are pivotally connected to a pair of pins 140 and 142 which are slidably supported in collars 144 and 146 which are secured to the inner surfaces of channel members 120 and 122, respectively. The pins 140 extend through the collar members 144 and 146 and through aligned openings in channel members 120 and 122 and the side frame members 26b and 28b. In the position illustrated in FIGURE 11 the front wheel assembly is latched securely to the frame of the semi-trailer. However, when handle 126 is pulled to the right as viewed in FIGURE 11 it pivots levers 128 and 130 and thereby withdraws pins 140 and 142 and permits relative movement between the front wheel assembly and the frame. When handle 126 is released the tension springs 148 and 150 urge the pins to their initial engaged position, and providing there are aligned holes in the channels 120 and 122 and the respective frame members the front wheel assembly will again be relatched to the frame. In order to hold the latching mechanism 123 in the unlatched position during the time that the front wheel assembly is being shifted as described hereinafter a projection 152 is provided. Bracket 50 has a member 154 depending therefrom having an opening 156 therein which provides support for rod 124 and also is sufficiently large to allow the passage of projection 152. To hold the latching mechanism 123 in the unlatched position it is necessary merely for the operator to pull the handle 126 to pull projection 152 through opening 156 and then raise the handle 126 so that the projection 152 abuts against the upper margin of opening 156 at the position indicated by the numeral 157. The rod will then remain in this position until the operator merely pushes the handle down whereupon the latching mechanism 123 will again return to its latched position.

When it is desired to shift front wheel assembly 20 from the position of FIG. 1 to that of FIG. 2, the latching mechanism 123 is first unlatched as described in the preceding paragraph. Next valves 117 and 119 (see FIG. 10) in air lines 112 and 114 respectively leading to the air brakes on the rear wheel assembly are closed and couplings 116 and 118 in these two lines are disconnected; also as a part of this second step valves 83a and 83b and 85a and 85b in lines 80 and 84 respectively (see FIG. 8) of the air suspension system leading to the rear air springs are closed, and then couplings 82 and 86 in these two lines are disconnected. Then the air brakes on the movable front trailer wheels are set by operating the brake pedal in the operator's station on the truck. Then, the valve 106 in the air brake system is closed to maintain air pressure in the actuators 91 and 92 and thereby maintain the brakes on the front wheel assembly in the engaged position. Next the couplings 104a and 104c are disconnected as are couplings 105a and 105c. Thereafter, while the brakes on the front wheel assembly remain set the highway tractor is backed up to move the semi-trailer with respect to the front wheel assembly until the latter reaches the rear end of the front section of the trailer and abuts stop member 159 (see FIG. 1) whereupon the latching mechanism 123 is released to latch the front wheel assembly to the front frame section of the trailer. Then the rear portion of coupling 104c is connected to the front portion of coupling 104a. Likewise the rear portion of coupling 105c is connected to the front portion of coupling 105a. Whereupon, after valve 106 is opened again, the brakes on the movable front wheel assembly may be operated by the truck operator in the normal manner.

Next in the operation of separating the two sections of the trailer the landing gear 160 for the rear section is moved from the position illustrated in FIG. 1 to the extended and lowered position illustrated in FIG. 2 in order to support the front end of the rear trailer section after the two sections have been separated. Then the latching means connecting the two sections of the trailer frame together are prepared for separating the two sections. These latching means are illustrated in detail in FIGS. 12–17 inclusive of the drawing, and comprise two manual latching mechanisms immediately above the level of the side frame members and two automatic latching mechanisms which are contained within the side frame members. One each of these latching mechanisms is illustrated in FIG. 12, the upper manual latching means being indicated generally by the numeral 170 while the lower automatic latching means is indicated by numeral 172. The upper latching mechanism is illustrated also in the larger scale views of FIGURES 13, 14 and 15 which are, respectively, a top plan view of the latching mechanism 170 of FIG. 12, a view of the latching mechanism from the left in FIG. 12, and a view of the latching mechanism from the right in FIG. 12.

The latching mechanism 170 comprises a round pin 174 which projects through an opening 176 in a bracket 178 secured to the top of the rear frame structure. The pin 174 has a handle 180 for turning the pin through approximately 90° and a pair of oppositely disposed projections 182 one on each side of the pin between opening 176 and the handle 180. The ends of these projections abut the surface 184 of bracket 178 in order to aid in clamping the two frame portions of the trailer together in a manner described below. The pin 174 also has a pair of oppositely disposed lug portions 186 projecting radially therefrom at right angles to projections 182. A bracket 188 on the forward frame section has a transversely disposed wall portion 190 provided with a horizontally disposed slot 192 therethrough which allows passage of lugs 186 when the pin 174 is turned approximately 90° from the position illustrated. Then as the handle 180 is utilized to rotate the pin 170 the lugs 186 engage slanted ramp portions 194 and 196 above and below, respectively, slot 192, and this produces a clamping action which connects bracket members 178 and 188 and hence the two trailer sections securely together. To unlatch locking mechanisms 170 the pin 174 is turned 90° to align lugs 186 with slot 192.

During the operation of separating the two sections of the trailer the locking mechanisms 170 are first turned to the unlatched position just described and then the automatic locking mechanisms 172 are prepared for unlatching. Each mechanism 172 includes a pair of jaws 200 and 201 which embrace a pin 202 when latching occurs. The pin 202 for each mechanism is carried between a pair of bracket members 204 which extend forwardly from the rear trailer section; these may be seen best in FIG. 16 of the drawing. The jaws pivot about pins 206 and are urged into the open position by springs 208 when member 210 is withdrawn to the left in FIGURE 12 to the released position shown by the dash-dot lines, although the jaws cannot actually open until the pin 202 has been moved outwardly to approximately the position illustrated in FIG. 17, because of projections 256 and 257 on the jaws 201 and 200 respectively which are discussed further hereinafter. The withdrawal of member 210 is accomplished by means of a lever 212 to which is pivotally connected a rod 214 which carries member 210. A spring 216 between member 210 and a fixed bracket 218 urges member 210 to the right. However, when lever 212 is pivoted clockwise by turning of rod 220 on which lever 212 is mounted member 210 is withdrawn from between the jaws 200 and 201 and they are placed in condition to open so that they can be withdrawn from pin 202. When this has been done the two sections of the trailer are ready to be separated. The turning of rod 220 is accomplished by means of an external lever 221 which is shown in the latched position in FIG. 1 and the unlatched position in FIG. 3.

In order to accomplish the separation it is necessary to hold the wheels of the rear wheel assembly 22, and this is accomplished by actuating a manual brake mechanism which is illustrated in FIGS. 18, 19 and 20 of the drawing. FIG. 18 is a fragmentary top plan view of the rear trailer section 10b showing the rear wheel assembly 22 and the manual brake mechanism, while FIG. 19 shows a side elevational view of the manual brake mechanism, and FIG. 20 is a fragmentary view along the line 20—20 of FIG. 18 illustrating the brake handle.

The manual brake mechanism is indicated generally by the numeral 224. Mechanism 224 comprises a hand lever 226 (see FIG. 20) which is secured by means of a bracket 228 to the side of rear wheel assembly 22. Handle 226 is connected by a link 230 to a rod 232 which in turn is pivotally connected to a triangularly shaped lever member 234 which is pivoted about point 236. A yoke member 240 is pivotally connected at 238 to member 234, and connected to the opposite ends of yoke 240 are operating cables 242 which in turn are connected by clevises 243 to a pair of levers 244. A side view of one of the levers 244 is shown in FIGURE 19, and it will be seen from this figure that lever 244 is connected to shaft 246 which is the operating shaft for the air brake mechanism on the left wheel of the rear wheel assembly 22, the air actuator 93 for this wheel being connected to another lever arm 248 which also is connected to the brake operating shaft 246. When handle 226 is raised from the solid line position shown in FIG. 20 to the position shown in phantom in FIG. 20 the mechanism causes the brakes on both sets of rear dual wheels to be applied.

After the manual brakes on wheel assembly 22 have been applied the two sections of the trailer are pulled apart by driving the highway tractor forwardly. This causes the disengagement of latching mechanisms 170 and 172. In the case of mechanisms 170 the projections 186 pass through slots 192. In the case of the latching mechanisms 172 the pin 202 of each such mechanism exerts a force on portions 200a and 201a respectively of the jaws 200 and 201 respectively which causes these jaws to separate and allow the pin to be released. Because of the projections 257 and 256 on the respective jaws, which were mentioned previously, it is not possible to open the jaws 200 and 201 without a substantial longitudinal force operating on portions 200a and 201a as just described. After disengagement of the two latching mechanisms the two sections of the trailer are then in the condition illustrated in FIGS. 2 and 3 except that section 10a is still connected to the tractor. However, it will be appreciated by those skilled in the art that the condition of FIG. 2 can be achieved merely by lowering landing gear 250 to support the front end of section 10a and then disconnecting the tractor in the usual manner. If desired, the tractor can be allowed to remain connected to front section 10a and the resulting vehicle may be operated as a short length tractor-semi-trailer vehicle having a single trailer wheel assembly 20. Prior to such operation the connections to the air brakes on wheel assembly 20 which previously were broken to shift this assembly are connected by the operator on the vehicle for operation by the operator's brake pedal in the manner described previously; such connections provide also for the supply of air to reservoir 60 of the air suspension system in this typical embodiment of the invention since the air reservoir 60 is supplied by the same compressor as the air brake system.

To reconnect the two trailer sections again they are placed in longitudinal alignment as illustrated in FIGS. 2 and 3 except, of course, the front trailer section 10a is secured to the tractor the same as in FIG. 1 and landing gear 250 is raised. The air springs described and illustrated herein are valuable during the connecting operation because with these springs it is possible by increasing or decreasing the air pressure in such springs to raise or lower the front frame section 10a, or to lower the rear frame section 10b by releasing air, to achieving the desired height to compensate for any irregularities in the surface upon which the two sections are resting. As may be seen in FIG. 8, bleed lines 261, 263, 265, and 267 have been provided to release air respectively from manifolds 72, 74, 76 and 78. The respective bleed lines are provided with shut-off valves 269, 271, 273 and 275 respectively which are opened to release air from the respective manifolds and their respective air springs in order to lower the air pressure therein, and so accomplish lowering of the portion of the semi-trailer above each of the respective pairs of air springs. It will be appreciated also by those familiar with air suspension mechanisms that it is possible to extend the air springs to an amount greater than normal and thereby increase the height of the portion of the trailer above such air springs by providing suitable valve means for by-passing the leveling valves and providing an added supply of air from the reservoir to the air springs. To facilitate the two sections going back together again in the proper manner a projection 252 having a tapered front portion 254 is provided on the front of the rear section 10b of the trailer. This is shown in FIG. 3 while FIG. 5 illustrates in dashed lines a top view of projection 252 and tapered portion 254. The rear end of front trailer section 10a is provided with a recess corresponding in configuration with projection 252 into which projection 252 enters during the connecting operation. The tapered portion 254 of the projection 252 corrects any misalignment which may exist as the reconnecting operation takes place by a camming action on the margins of the recess in the front section of the trailer.

After the two sections of the trailer are aligned and prepared to be reconnected the mechanical brake mechanism 224 on the rear wheel assembly is operated to set the brakes on the rear wheels. Then the tractor is operated to back up the front section 10a of the trailer to position projection 252 on the rear trailer section 10b in the receptacle in front trailer section 10a. The automatic latching mechanisms 172 have previously been conditioned for relatching by releasing lever 212 to allow member 210 to rest against jaws 200 and 201 as illustrated in FIG. 17 whereby as soon as pin 202 enters the jaws and engages projection 256 on jaw 201 and projection 257 on jaw 200 to force the jaws together member 210 enters the space between jaws 200 and 201. This occurs with the automatic latching mechanisms on both sides of the trailer whereby they are automatically latched. Thereafter both of the manual locking devices 170 are operated in a manner described previously whereupon the two sections of the trailer are securely connected together.

The manual braking mechanism 224 is released. Then the movable wheel assembly is moved from the front trailer section to the rear trailer section by a procedure opposite to that described hereinbefore. That is, the air brakes are set on the movable wheel assembly 20 after which the air systems for both the air springs and the air brakes are disconnected. Next the tractor is driven forwardly to move the remainder of the trailer assembly forwardly with respect to the movable wheel assembly. When this wheel assembly has moved into position adjacent the rear wheel assembly the latching mechanism 123 is released to connect the movable wheel assembly to the frame portion of the rear trailer section, and the air connections for the air springs and the air brakes are restored. Thereafter the trailer 10 may be operated as a single long-length unit with tandem axles as illustrated in FIG. 1.

While I have described and illustrated herein a two-section trailer in which only the front section can be used separately as a semi-trailer after the two sections are separated it will be readily apparent that it is possible to arrange the rear section for use as a separate semi-trailer unit also merely by adding a king pin to the front of the frame portion of the rear section and providing the necessary air reservoirs, valves and connections for supplying air to the air springs and the air brakes on the rear wheel assembly when the rear trailer section is detached from the front trailer section.

It will be appreciated by those skilled in the art that other modifications of this invention also may be made without departing from the present invention. It should be understood therefore that I intend to cover by the appended claims all modifications which fall within the true spirit and scope of this invention.

I claim:

1. In a trailer having a horizontally disposed frame structure separable into two portions, each of the frame portions including a pair of longitudinal side rails adaptable to be connected in longitudinal alignment respectively with the side rails of the other frame portion, means for releasably connecting the two frame portions together including automatic latching means and manual latching means, the said automatic latching means comprising a pair of transversely disposed pins carried by brackets projecting from the abutment end of one of the frame portions below the upper surfaces thereof, two pairs of spring loaded jaws located respectively within the side rails of the other frame portion adapted to be engaged respectively by the said pin members and to embrace and hold such pin members when the said abutment end of the one frame portion is moved into abutting relation with the abutment end of the other frame portion, the said manual latching mechanism comprising a first pair of upwardly projecting brackets positioned at the abutment end of the said first frame portion, a second pair of upwardly projecting brackets at the abutment end of the other frame portion adapted to abut the said first pair of upwardly projecting brackets when the two frame portions are connected together, horizontally disposed pins having lug portions thereon, and ramp portions on one of said pairs of brackets adapted to be engaged by said lug portions for securely fastening the said pair of brackets on one frame portion respectively to the said pair of brackets on the other frame portion.

2. A two-section trailer comprising, a horizontally disposed frame structure having an upper surface and separable into a front frame portion and a rear frame portion, each of the said frame portions including a pair of longitudinal side rails adapted to be connected in longitudinal alignment respectively with the side rails of the other frame portion, means for releasably connecting the two frame portions together including automatic latching means and manual latching means, the said automatic latching means comprising a pair of transversely disposed pins carried by brackets projecting from the abutment end of one of the frame portions below the upper surfaces thereof, two pairs of spring loaded jaws located respectively within the side rails of the other frame portion adapted to be engaged respectively by the said pin members and to embrace and hold such pin members when the said abutment end of the one frame portion is moved into abutting relation with the abutment end of the other frame portion, the said manual latching mechanism comprising a first pair of upwardly projecting brackets positioned at the abutment end of the said one frame portion, a second pair of brackets at the said abutment end of the other frame portion adapted to abut the said first pair of upwardly projecting brackets respectively when the two frame portions are connected together, and means comprising horizontally disposed pins having lug portions thereon and ramp portions on one of said pairs of brackets adapted to be engaged by said lug portions for securely fastening the said pair of brackets on one frame portion respectively to the said pair of brackets on the other frame portion, a first wheel assembly secured to the said rear frame portion, a second wheel assembly arranged to be located beneath the said rear frame portion in front of the said first wheel assembly and slidable from the said rear frame portion onto the said front frame portion when the two frame portions are connected together, and means for securing the said second wheel assembly selectively to the said rear frame portion and to the said front frame portion.

3. A two-section semi-trailer comprising, a horizontally disposed frame structure having an upper surface and separable into a front frame portion and a rear frame portion, each of the said frame portions including a pair of longitudinal side rails adapted to be connected in longitudinal alignment respectively with the side rails of the other frame portion; means for releasably connecting the two frame portions together including two automatic latching mechanisms and two manual latching mechanisms; each automatic latching mechanism comprising a pair of brackets projecting from the abutment end of one of the frame portions below the upper surface thereof, a transversely disposed pin carried between the said pair of brackets, a pair of jaws located within the corresponding side rail of the other frame portion, a pair of projections on the respective jaws adapted to be engaged by the said pin member when the two frame portions are moved into abutting relation, the engagement of the pins with the said projections closing the jaws to enclose and embrace the said pin member, the said jaws having a joint recess therebetween at the end of the jaws opposite the portions of the jaws which embrace the pin, a spring-loaded member arranged to move into said recess when the jaws are closed and prevent their opening until said member has been removed against the force of the spring, manual operating means for removing said member against the force of the spring, and two additional springs arranged to hold the said jaws respectively in the open position after the said member has been removed and the said pin has been pulled forcibly out of the said jaws; each said manual latching mechanism comprising a first upwardly projecting bracket positioned at the abutment end of one said frame portion, a second upwardly projecting bracket at the said abutment end of the other frame portion adapted to abut the said first upwardly projecting bracket when the two frame portions are moved together, one of the said brackets having a circular opening therein and the other having an elongated slot therein, means for manually connecting the said two abutments securely together comprising a longitudinally extending horizontally disposed pin through the said circular opening in one bracket, a pair of lugs on opposite sides of the said pin adjacent one end thereof adapted to pass through the said elongated slot as the two frame portions are moved together, a pair of ramp portions on said second bracket adapted to be engaged by the said lug portions when the pin is turned, and a handle on the other end of the said pin for turning it to clamp the two brackets securely together; a first wheel assembly secured to the said rear frame portion; a second wheel assembly arranged to be located beneath the said rear frame portion and in front of the said first wheel assembly; and means for moving the said second wheel assembly forwardly from the said rear frame portion onto the said front frame portion and from the front frame portion back to the rear frame portion again when the two frame portions are connected together, the said last-named means including a latching mechanism for latching the said wheel assembly selectively to the front frame portion and to the rear frame portion; whereby the two-section semi-trailer may be operated as a single tandem axle unit or the front section with the second wheel assembly secured thereto may be operated separately as a single axle semi-trailer.

References Cited in the file of this patent

UNITED STATES PATENTS

| | | |
|---|---|---|
| 1,565,112 | Sommer | Dec. 8, 1925 |
| 2,182,941 | Cummings | Dec. 12, 1939 |
| 2,710,659 | Moederle | June 14, 1955 |
| 2,733,931 | Reid et al. | Feb. 7, 1956 |
| 2,841,094 | Schumacher | July 1, 1958 |
| 2,881,799 | Menewisch | Apr. 14, 1959 |
| 2,894,763 | Karnath et al. | July 14, 1959 |
| 2,899,237 | Nash | Aug. 11, 1959 |
| 2,990,194 | Abolins | June 27, 1961 |
| 3,004,772 | Bohlen et al. | Oct. 17, 1961 |
| 3,061,332 | Goulden | Oct. 30, 1962 |

FOREIGN PATENTS

| | | |
|---|---|---|
| 29,623 | Netherlands | Apr. 15, 1933 |
| 882,806 | Germany | July 13, 1953 |